(12) United States Patent
Marini

(10) Patent No.: US 9,873,557 B2
(45) Date of Patent: Jan. 23, 2018

(54) DISPOSABLE CANISTER FOR SEALANT FOR INFLATABLE ARTICLE REPAIR AND INFLATION KIT, AND PRODUCTION THEREOF

(71) Applicant: TEK GLOBAL S.r.l., Pasaro (IT)

(72) Inventor: Maurizio Marini, Pasaro (IT)

(73) Assignee: TEK GLOBAL S.R.L., Pesaro (IT)

( * ) Notice: Subject to any disclaimer, the term of this patent is extended or adjusted under 35 U.S.C. 154(b) by 697 days.

(21) Appl. No.: 13/964,477

(22) Filed: Aug. 12, 2013

(65) Prior Publication Data

US 2015/0041020 A1    Feb. 12, 2015

(51) Int. Cl.
| | |
|---|---|
| *B65D 85/00* | (2006.01) |
| *B29C 73/16* | (2006.01) |
| *B29C 65/06* | (2006.01) |
| *B65B 7/28* | (2006.01) |
| *B65D 25/38* | (2006.01) |
| *B65D 53/06* | (2006.01) |
| *B29L 31/00* | (2006.01) |

(52) U.S. Cl.
CPC .............. *B65D 85/70* (2013.01); *B29C 65/06* (2013.01); *B29C 73/166* (2013.01); *B65B 7/2878* (2013.01); *B65D 25/38* (2013.01); *B65D 53/06* (2013.01); *B29L 2031/712* (2013.01); *Y10T 29/49968* (2015.01)

(58) Field of Classification Search
CPC ............................. B29C 73/166; B29C 65/06
USPC ................................................ 141/3, 20, 38
See application file for complete search history.

(56) References Cited

U.S. PATENT DOCUMENTS

| | | | | |
|---|---|---|---|---|
| 3,850,776 A | * | 11/1974 | Karobath | B29C 65/08 156/475 |
| 3,973,715 A | * | 8/1976 | Rust | B23K 20/12 228/114.5 |
| 4,069,091 A | * | 1/1978 | van Manen | B29C 37/04 156/267 |
| 5,031,384 A | * | 7/1991 | Rebeyrolle | B65D 83/62 141/20 |
| 5,909,752 A | * | 6/1999 | Gerresheim | B29C 73/166 141/105 |
| 5,930,332 A | * | 7/1999 | Eggleston | H01J 35/10 228/113 |
| 7,694,698 B2 | * | 4/2010 | Marini | B29C 73/166 141/38 |
| 7,811,532 B2 | * | 10/2010 | Kerr | F16K 1/305 137/505.33 |
| 8,201,586 B2 | * | 6/2012 | Yoshida | B29C 73/166 141/105 |
| 8,297,321 B2 | * | 10/2012 | Chou | B29C 73/166 141/38 |
| 8,453,684 B2 | * | 6/2013 | Lolli | B29C 73/166 137/223 |

(Continued)

*Primary Examiner* — Timothy L Maust
(74) *Attorney, Agent, or Firm* — Ladas & Parry LLP

(57) ABSTRACT

A disposable canister filled with sealant liquid has an inner closure for retaining the sealant liquid inside the canister; a compressed-air inlet conduit; an outlet conduit for receiving the sealant liquid when the closure is in an open position; a first portion having one of the inlet and outlet conduits; and a second portion; the first and second portions being joined by a weld to form a tank which holds the sealant liquid in a ready-for-use position by means of the closure.

21 Claims, 3 Drawing Sheets

(56) References Cited

U.S. PATENT DOCUMENTS

| | | | | |
|---|---|---|---|---|
| 8,746,292 B2* | 6/2014 | Lolli | ............... | B29C 73/166 |
| | | | | 141/197 |
| 8,997,802 B2* | 4/2015 | Lolli | ............... | B29C 73/166 |
| | | | | 141/197 |
| 2006/0118603 A1* | 6/2006 | Le Cocq | ............ | B23K 10/02 |
| | | | | 228/212 |
| 2012/0308378 A1* | 12/2012 | Kobayashi | ......... | B23K 9/0286 |
| | | | | 415/214.1 |
| 2014/0210194 A1* | 7/2014 | Horn | ............... | B60R 21/274 |
| | | | | 280/737 |

* cited by examiner

DISPOSABLE CANISTER FOR SEALANT FOR INFLATABLE ARTICLE REPAIR AND INFLATION KIT, AND PRODUCTION THEREOF

The present invention relates to a disposable sealant liquid canister or container for an inflatable article, e.g. vehicle tyre, repair and inflation kit.

BACKGROUND OF THE INVENTION

A sealant liquid canister comprises an air in and a sealant liquid and/or air outlet, and defines an inner volume or tank filled with sealant liquid.

A user-safe canister is needed, designed to also prevent accidental sealant liquid leakage as a result, for example, of tampering.

SUMMARY OF THE INVENTION

According to the present invention, there provided a disposable sealant liquid canister for an inflatable article repair and inflation kit.

According to the present invention, there are provided a disposable sealant liquid canister for an inflatable article repair and inflation kit, as claimed in Claim 1, and a relative production method as claimed in Claim 19.

BRIEF DESCRIPTION OF THE DRAWINGS

A non-limiting embodiment of the invention will be described by way of example with reference to the attached drawings, in which.

DETAILED DESCRIPTION OF THE INVENTION

Figure 1:
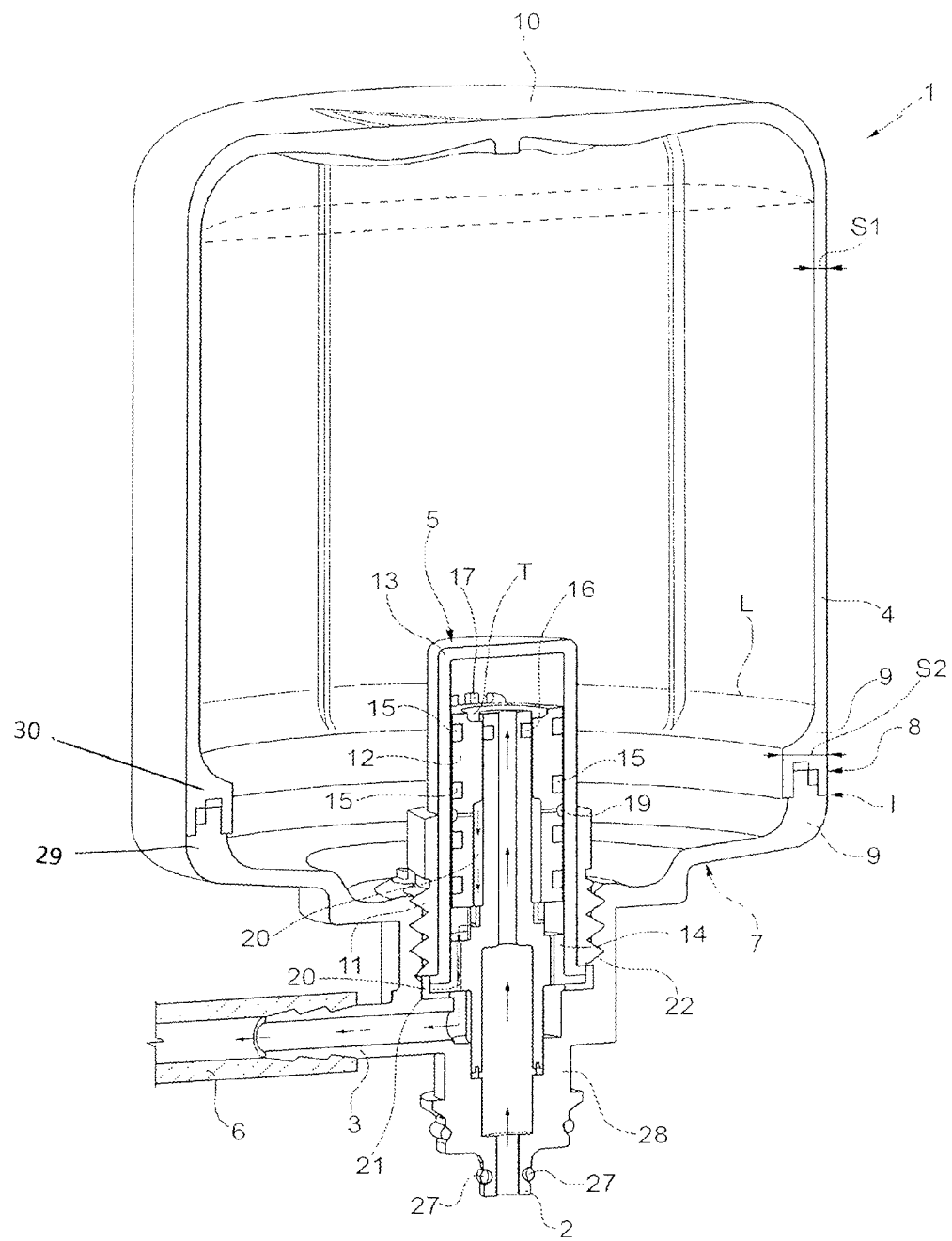
FIG. 1 shows a perspective view with a longitudinal section of a disposable canister in accordance with the present invention.

Number 1 in FIG. 1 indicates a disposable sealant liquid canister having an inlet conduit 2 connectable to a compressed-air source; an outlet conduit 3 connectable to an inflatable article, such as a tyre; and a tank 4 filled with sealant liquid. Canister 1 also comprises a closure 5 for retaining the sealant liquid inside tank 4 and preventing it from flowing accidentally, by gravity or otherwise, into inlet conduit 2 and/or outlet conduit 3. In a ready-for-use position, i.e. in which the sealant liquid is injected when the inlet conduit is pressurized, closure 5 is located below the surface of the sealant liquid, which thus exerts hydrostatic pressure on the stopper.

Canister 1 preferably also comprises a disposable tube 6 fixed rigidly and irreversibly, e.g. by means of a clamp or metal or plastic collar, to outlet conduit 3. Tube 6 may be a hose, and may comprise a releasable connector (not shown), e.g. a ring nut or a press-on, lever-activated connector, for connection to a tyre valve to inject sealant liquid or air. Tube 6 is thus also changed with the rest of canister 1 after the sealant liquid is injected and/or exceeds its use-by date. Canister 1 preferably forms a disposable part of a kit, which also comprises a stand (not shown) connectable to a pressure source to hold the canister in a sealant-injection position; and/or a portable electric compressor (not shown) for generating airflow along an air line into inlet conduit 2.

Canister 1 is produced so that inlet and outlet conduits 2 and 3 and tank 4 form a single welded body, more specifically with one weld.

Accordingly, canister 1 comprises a first portion 7 defining at least one of inlet and outlet conduits 2 and 3; and a second portion 8, one of first or second portions 7 and 8 being concave to contain all the sealant liquid in a welding position.

First and second portions 7 and 8 are made, e.g. molded, from the same polymer material. And the weld is a friction weld, in particular a rotation friction weld. In which case, the weld interface between first and second portions 7 and 8 is circular.

The weld is preferably a butt weld and, when made by friction, the thickness S2 of at least one weld area 9 of at least one of the first and second portions 7 and 8 is greater than the minimum thickness s1 of relative portion 7, 8. More specifically, the weld area 9 defines an interface I along which first and second portions 7 and 8 are contacted prior to welding. The weld may be formed between an annular male portion 29 and a female ring portion 30 respectively and engaged one inside the other to position the first and second portions correctly for welding.

In the FIG. 1 embodiment, weld area 9 of second portion 8 is located far enough from the top end 10 of second portion 8 to form a concave shape in which to contain all the sealant liquid in the welding position.

The welding position of second portion 8 is preferably inverted with respect to the position in FIG. 1, and the surface of the sealant liquid in the welding position reaches but does not exceed weld area 9 of second portion 8. The concavity of second portion 8 in the welding position is large enough to contain by gravity enough sealant liquid for repair purposes, e.g. to repair a flat tyre. Line L in FIG. 1 indicates an approximate surface level of the sealant liquid when second portion 8 is in the welding position on a horizontal surface.

First portion 7 preferably comprises inlet conduit 2, outlet conduit 3, and relative weld area 9 in one piece. And, in the FIG. 1 embodiment, closure 5, when closed, is connected to first portion 7 to keep the sealant liquid inside tank 4, and to isolate tank 4 from both inlet conduit 2 and outlet conduit 3 until the stopper is released.

Closure 5 is advantageously irreversible, i.e. can be opened to fluidically connect inlet conduit 2 and outlet conduit 3 via tank 4, but cannot be closed again by the user. This simplifies the design of closure 5 and reduces production cost.

Closure 5 may be a preassembled unit manufactured separately from the other component parts of canister 1, and comprises a connector 11 for anchoring to first portion 7. Closure 5 preferably comprises a shutter 12 for closing tank 4 towards inlet conduit 2 and/or outlet conduit 3. Shutter 12 is connected to first portion 7 by connector 11, and is fitted to the latter.

In the FIG. 1 embodiment, shutter 12 is housed inside a casing 13, and is movable with respect to a sleeve 14. Casing 13 and sleeve 14 are connected rigidly to first portion 7 by connector 11, and shutter 12 slides, guided by casing 13 and/or sleeve 14.

Shutter 12 is fitted with seals 15, which slide along casing 13, and seals 16 are also provided between shutter 12 and sleeve 14.

Figure 2:
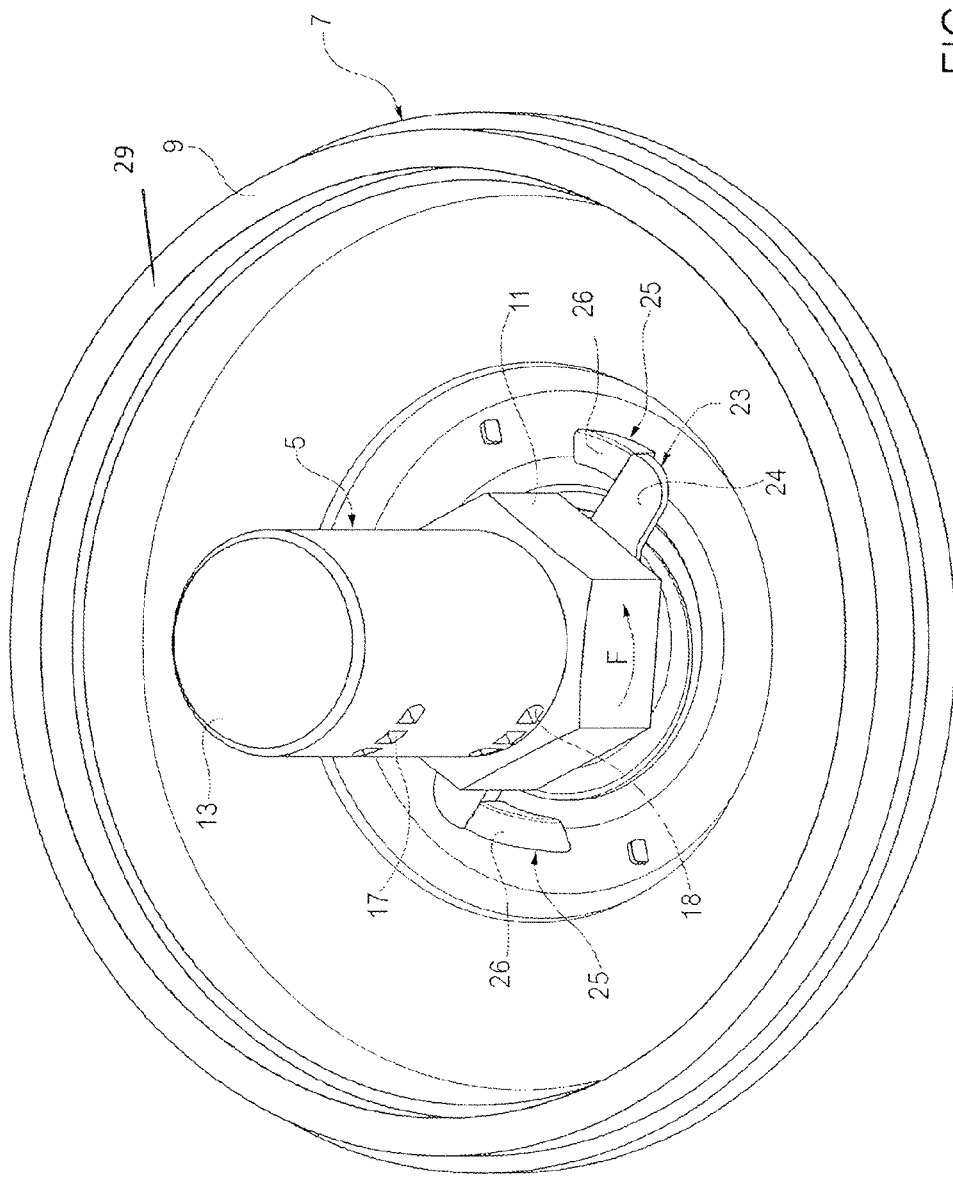
FIG. 2 shows a perspective view of a detail of FIG. 1.

Casing 13 has one or more inlets 17 and one or more outlets 18 (FIG. 2). Sleeve 14 is hollow to connect inlet conduit 2 to inlets 17 when shutter 12 is in an open position (FIG. 1). In the open position, outlets 18 are connected to outlet conduit 3 by movable channels 19 on shutter 12, and by fixed channels 20 defined by or between sleeve 14, shutter 12 and casing 13. In the open position, movable channels 19 are connected to fixed channels 20, and seals 15 isolate inlets 17 from outlets 18 inside casing 13.

In a closed position, i.e. that in which closure 5 is assembled, shutter 12 closes both inlets 17 and outlets 18 with respect to inlet and outlet conduits 2 and 3 by means of seals 15 and 16. More specifically, one seal 15 separates sleeve 14 fluidically from inlets 17, and other seals 15 close outlets 18 and disconnect the latter from movable channels 19. In the closed position (FIG. 3), shutter 12 is positioned higher than in the FIG. 1 position. To move it into the open position, shutter 12 is pushed downwards by high pressure exerted on the head of shutter 12 inside casing 13, and which is generated by a pressure source connected to inlet conduit 2. When shutter 12 is in the open position, the high pressure flows into tank 4 through inlets 17, and so pushes the sealant liquid out through outlets 18, which are connected to the pressure of the article for repair. When the surface of the sealant liquid drops below outlets 18, the compressed air flows substantially towards outlet conduit 3.

A fixed seal 21 is also provided to prevent sealant liquid from leaking, between connector 11 and first portion 7, into outlet conduit 3.

Connector 11 is fitted to first portion 7 by a shape coupling, which is preferably a combination of a threaded connector 22 and a self-lock stop 23. Threaded connector 22 is preferably calibrated to exert pressure on seal 21 as it is torqued. Self-lock stop 23 comprises a combination of one or more flexible tabs 24 and asymmetrical stops 25. As the threaded connector is torqued, flexible tabs 24 flex up along sloping surfaces 26 on asymmetrical stops 25 until connector 11 comes to an axial stop with respect to first portion 7. In the unscrew direction indicated by arrow F, stop surfaces on asymmetrical stops 25 intercept and prevent tabs 24 from flexing, thus preventing the threaded connector from being unscrewed.

Canister 1 is manufactured as follows.

First and second portions 7 and 8 are each molded, preferably each in one piece.

Closure 5 is fitted in the closed position to first portion 7.

Second portion 8, with weld area 9 facing up and top end 10 down, is filled with an amount of sealant liquid sufficient for repair, roughly to the level of line L.

First portion 7 is fitted to, to close, second portion 8 filled with sealant liquid, and the two are then welded.

Figure 3:
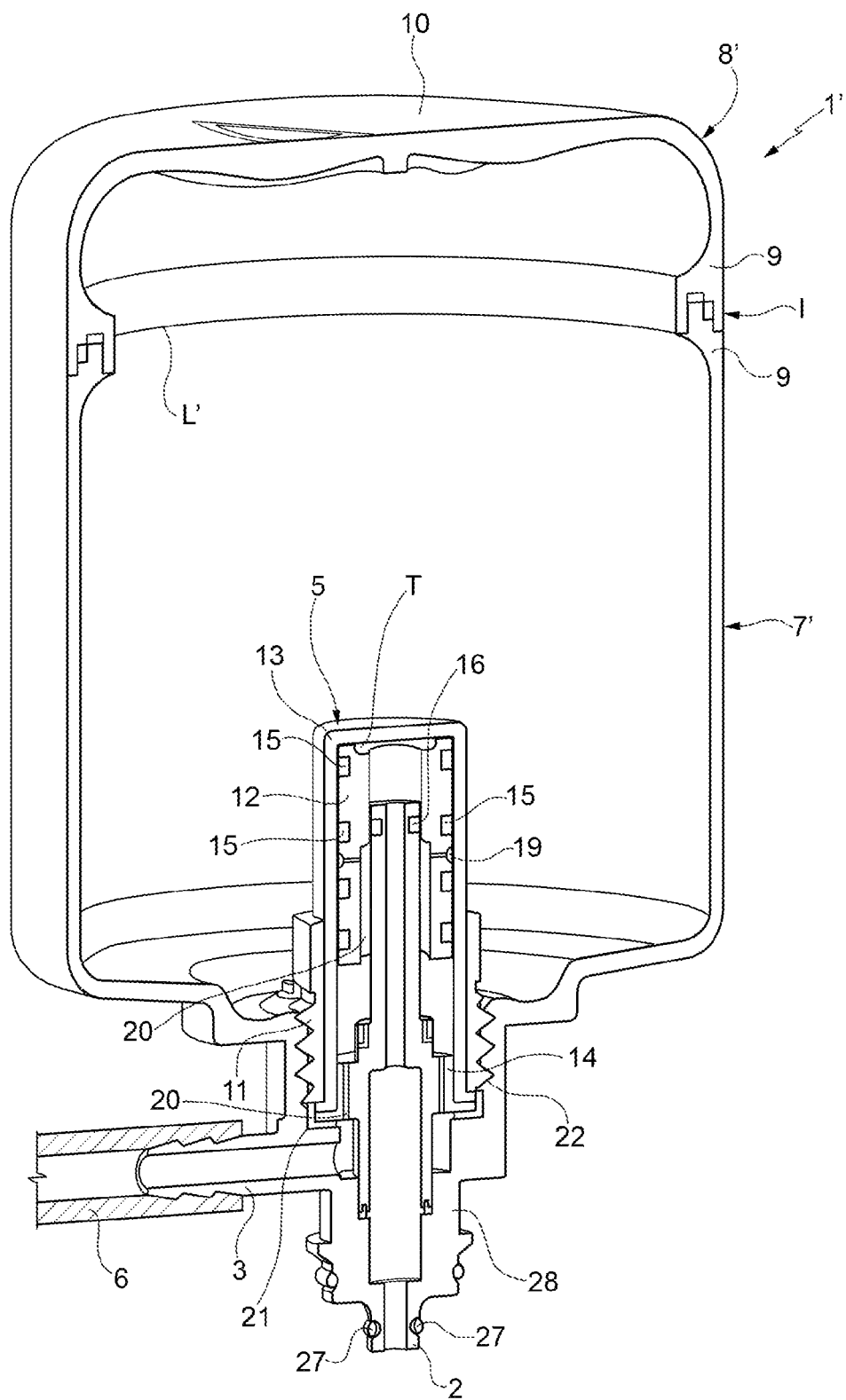
FIG. 3 shows a perspective view with a longitudinal section of a disposable canister in accordance with a further embodiment of the present invention.

FIG. 3 shows another embodiment of the present invention, in which a disposable canister 1' is the same as in FIG. 1, except that a first portion 7', when closed by closure 5, is concave to contain the repair amount of sealant liquid; and a second portion 8' is substantially in the form of a lid welded to first portion 7'. More specifically, weld area 9 of first portion 7' is located far enough from closure 5 to define a volume large enough to contain the repair amount of sealant liquid. In this embodiment, the welding position of first portion 7' is the one shown in FIG. 3.

In the embodiment of FIG. 3, closure 5 must be fitted inside first portion 7', to close inlet and outlet conduits 2 and 3, before first portion 7' is filled with the amount of sealant liquid suitable for repair, so as to retain the sealant liquid inside first portion 7' during the welding operation. FIG. 3 shows closure 5 in the closed position.

Apart from what is explicitly stated above, the component parts of canister 1' are the same as those of canister 1, as shown also by use of the same reference numbers with no superscripts.

The disposable canister 1, 1' according to the present invention has the following advantages.

The welding safeguards against any attempt to tamper with, and so enhances the safety of, sealant liquid canister 1. Closure 5, in particular, is protected inside the canister once this is welded, and so cannot be tampered with by the user or damaged. The sealant liquid is preferably poured into the canister before the latter is welded, so that, once welded, canister 1 is ready for use. The sealant liquid can therefore be inspected when it is already inside portion 8 or 7'.

This is particularly advantageous when closure 5 is irreversible, in that canister 1 is filled before being fitted with closure 5, which is therefore only opened for the repair function.

Clearly, changes may be made to disposable canister 1, 1' as described and illustrated herein without, however, departing from the protective scope defined in the accompanying Claims.

Inlet and outlet conduits 2, 3 may be positioned differently from those shown in the drawings. Normally, at least one of inlet and outlet conduits 2, 3 is located beneath the sealant liquid surface level, where the sealant liquid is injected into the inflatable article for repair.

Closure 5 may also differ from the one shown. For example, closure 5 may comprise a reversible valve, which returns automatically to the closed position when injection of the sealant liquid is completed or interrupted, for example, by the user.

Though the description refers to a closure 5 opened by air pressure, i.e. a pneumatic shutter, other types also exist, both irreversible, such as tear film, and reversible, such as valves. In both cases, closure 5 may also be opened manually by the user, e.g. using release controls or tools.

First portion 7 is preferably designed to form a male or female element 28 of a releasable shape coupling for connection to a stand for supporting canister 1 in the injection position. Even more preferably, first portion 7 comprises seals 27, in particular sealing rings, to define both a mechanical connection to a stand, and at the same time a fluidtight connection to the delivery side of the compressor. In the latter case, the sealing rings are fitted to inlet conduit 2, and the male or female element is also formed on inlet conduit 2.

Connector 11 may advantageously be formed, e.g. molded, in one piece with casing 13.

When assembling shutter 5, at least seal 21 and sleeve 14 are fixed rotationally. Casing 13 may also be fixed as connector 11 is torqued; or, if both are formed in one piece, casing 13 rotates with respect to sleeve 14 and seal 21 as connector 11 is torqued. Being compressed between sleeve 14 and first portion 7, seal 21 is thus compressed without any undue twisting.

Any other self-lock threaded means may be substituted for tabs 24.

The seal 27 next to outlet conduit 3 may be omitted.

The invention claimed is:

1. A disposable canister filled with sealant liquid said canister having a body section and a neck section narrower than the body section, said neck section comprising an inner closure (5) for retaining said sealant liquid inside the canister (1); a compressed-air inlet conduit (2); an outlet conduit (3) for receiving the sealant liquid when said closure (5) is in an open position; said canister comprising a first portion (7) including said neck section and forming one piece with at least one of said inlet and outlet conduits (2, 3); and a second portion (8); said first and second portions (7, 8) being joined by a rotation friction weld to form a tank (4) which, by means of said closure (5), holds the sealant liquid in a ready-for-use position in which the sealant liquid exerts hydrostatic pressure on said closure (5), said weld being located on the body section of the canister such that the sealant liquid can be present in one portion of the canister prior to the weld being formed, the weld being of such nature that at least one of said first and second portions (7, 8) has a minimum thickness (S1); and a weld area (9, I) of a thickness (S2) greater than said minimum thickness.

2. A canister as claimed in claim 1, characterized in that said weld is so located that said sealant liquid is retained by gravity inside one of said first and second portions (7, 8).

3. A canister as claimed in claim 1, characterized in that said first and second portions (7, 8) are made of the same polymeric material.

4. A canister as claimed in claim 1, characterized in that said weld is a butt weld.

5. A canister as claimed in claim 1, characterized in that said closure (5) is irreversible.

6. A canister as claimed in claim 1, characterized in that at least one of said inlet and outlet conduits (2, 3) forms one piece with said first portion (7).

7. A canister as claimed in claim 1, characterized in that one of said first and second portions (7, 8) forms one piece with a male or female element (28) of a shape coupling by which to fix said canister to a stand.

8. A canister as claimed in claim 1, characterized in that said outlet conduit (3) is fitted with a disposable tube (6) connectable releasably to an inflatable article to inject the sealant liquid and/or compressed air.

9. A canister as claimed in claim 1, characterized in that said closure (5), in a closed position, separates both said inlet conduit (2) and said outlet conduit (3) from the sealant liquid.

10. A canister as claimed in claim 1, characterized in that said closure (5) is a preassembled unit connected rigidly, in a closed position, to one of said first and second portions (7, 8).

11. A canister as claimed in claim 1, characterized in that both said inlet conduit (2) and said outlet conduit (3) are formed in one piece with said first portion (7).

12. A canister as claimed in claim 1, characterized in that said inlet conduit (2) and said outlet conduit (3) are fluidically connected solely by said tank (4) when said closure (5) is open.

13. A canister as claimed in claim 1, characterized in that the surface of the sealant liquid is above at least one of said inlet and outlet conduits (2, 3) when the sealant liquid is injected.

14. A canister as claimed in claim 1, characterized in that said closure (5) is pressure-released by air pressure.

15. A canister as claimed in claim 1, characterized in that said weld is one in number.

16. A canister as claimed in claim 1, characterized in that one of said first and second portions (7; 8) is concave and, in a welding position, contains a repair amount of sealant liquid.

17. A canister as claimed in claim 1, characterized in that said second portion comprises a ring and said first portion comprises an annular seat to house the ring.

18. A method of producing a disposable canister having a body section and a neck section narrower than the body section, said neck section comprising an inner closure (5) for retaining sealant liquid inside the canister (1); a compressed-air inlet conduit (2); an outlet conduit (3) for receiving the sealant liquid when said closure (5) is in an open position; a first portion (7) having one of said inlet and outlet conduits (2, 3); and a second portion (8); the method comprising the steps of:
  fitting said closure to one of said first and second portions (7, 8);
  introducing sealant liquid into the first or second portion of said canister and orienting said portion such that the sealant liquid remains in said portion under the influence of gravity; and
  then rotation friction welding the first and second portions together to form said canister so as to form a weld in the body section of said canister.

19. A method as claimed in claim 18, characterized in that one of said first and second portions is concave and, in a welding position, contains an amount of sealant liquid suitable for repair; and wherein said first or second concave portion (7, 8) is filled with the amount of sealant liquid prior to said welding step.

20. A method as claimed in claim 18, characterized in that said closure (5) closes at least one of said inlet and outlet conduits (2, 3); and said fitting step is performed before said first or second concave portion is filled, so as to retain the sealant liquid in one of said first and second portions (7, 8) by means of said closure (5).

21. A method as claimed in claim 18, characterized in that said second portion comprises a ring and said first portion comprises an annular seat to house the ring thereby providing appropriate guidance during spinning occurring during rotation friction welding.

\* \* \* \* \*